United States Patent [19]

Ito et al.

[11] 4,005,182

[45] Jan. 25, 1977

[54] STABLE SODIUM SULFATE-HYDROGEN PEROXIDE-SODIUM CHLORIDE ADDUCT AND PROCESS FOR PREPARING SAME

[75] Inventors: Yoshio Ito; Toshio Mashiko, both of Kohriyama, Japan

[73] Assignees: Kao Soap Co., Ltd.; Nippon Peroxide Co., Ltd., both of Tokyo, Japan

[22] Filed: July 7, 1975

[21] Appl. No.: 593,202

[52] U.S. Cl. ............................ 423/467; 8/108 R; 252/94; 423/512 R; 423/582

[51] Int. Cl.² ................ C01B 17/46; C01B 17/98; C01B 15/00; C11D 3/395

[58] Field of Search .......... 423/513, 472, 473, 475, 423/476, 584, 467, 512, 582; 252/94, 95; 8/108, 109, 110, 111

[56] References Cited

UNITED STATES PATENTS

| | | | |
|---|---|---|---|
| 2,433,661 | 12/1947 | Hampel | 8/109 |
| 3,048,546 | 8/1962 | Lake et al. | 252/95 |
| 3,755,179 | 8/1973 | Fitzgerald, Jr. | 252/95 |

OTHER PUBLICATIONS

Chemical Abstracts, vol. 59, 1968, p. 4954, Abstract No. 52909x.
Mellor, A Comprehensive Treatise of Inorganic & Theoretical Chemistry, Longmans Green & Co., NY, NY, 1922, p. 940.

*Primary Examiner*—Oscar R. Vertiz
*Assistant Examiner*—Gary P. Straub
*Attorney, Agent, or Firm*—Woodhams, Blanchard and Flynn

[57] ABSTRACT

An adduct having the formula: $4Na_2SO_4 \cdot 2H_2O_2 \cdot NaCl$, is prepared by reacting sodium sulfate with hydrogen peroxide in an aqueous solution, in the presence of sodium chloride in the reaction system.

5 Claims, No Drawings

STABLE SODIUM SULFATE-HYDROGEN PEROXIDE-SODIUM CHLORIDE ADDUCT AND PROCESS FOR PREPARING SAME

BACKGROUND OF THE INVENTION

1. Field of the Invention

This invention relates to a process for the preparation of a sodium sulfate-hydrogen peroxide-sodium chloride adduct and the product of that process.

2. Description of the Prior Art

As hydrogen peroxide adducts of inorganic compounds, there are generally employed sodium percarbonate, sodium perborate and several kinds of phosphate-hydrogen peroxide adducts. These adducts are employed mainly for bleaching, sterilization and the like.

The fields of use of these hydrogen peroxide adducts are frequently limited by the properties of the starting inorganic compounds, and because most of the above-mentioned hydrogen peroxide adducts have a very high alkalinity in aqueous solutions, various limitations are imposed on the uses of these adducts.

It is considered that hydrogen peroxide adducts of neutral compounds such as sodium sulfate can be used for overcoming that disadvantage. However, because the stability of sodium sulfate-hydrogen peroxide adduct is very poor, processes for preparing same and processes of using this hydrogen peroxide adduct have scarcely been reported in the art. Only the results of a few research studies made on properties of this adduct have been reported. Various sodium sulfate-hydrogen peroxide adducts differing in their compositions are formed according to the phase equilibrium relation of $Na_2SO_4$—$H_2O_2$—$H_2O$, and they are represented by the general formula $Na_2SO_4 \cdot mH_2O_2 \cdot nH_2O$. In general, $m$ is from 0.5 to 2 and $n$ is from 0 to 1.

The stability of such hydrogen peroxide adducts formed by customary concentration methods or the like is very poor. For example, when they are allowed to stand still at 50° C. overnight, a large percentage (more than 20%) of the hydrogen peroxide is lost. Therefore, these hydrogen peroxide adducts cannot be put into practical use. Nevertheless, in view of the fact that sodium sulfate is neutral and non-toxic and is a substance that is available at a low cost and is now used in large quantities as a builder for synthetic detergents, it is considered that if it be possible to prepare a stable sodium sulfate-hydrogen peroxide adduct on an industrial scale, significant advantages will be attained.

It is therefore a primary object of this invention to provide a process for preparing, on an industrial scale, a stable sodium sulfate-hydrogen peroxide adduct.

We have discovered a process according to which a stable sodium sulfate-hydrogen peroxide adduct can be prepared very easily.

SUMMARY OF THE INVENTION

More specifically, in accordance with this invention, there is provided a process for preparing a sodium sulfate-hydrogen peroxide adduct by reacting sodium sulfate with hydrogen peroxide, in an aqueous solution, wherein sodium chloride is made present in the reaction system.

The unique sodium sulfate-hydrogen peroxide adduct obtained by the process of the invention has the formula:

$$4Na_2SO_4 \cdot 2H_2O_2 \cdot NaCl$$

In practicing the process of this invention, there can be adopted (1) a method in which sodium chloride is added in a liquid formed by dissolving sodium sulfate in an aqueous solution of hydrogen peroxide, thereby to salt out the desired sodium sulfate-hydrogen peroxide adduct, (2) a method in which sodium chloride is first dissolved in an aqueous solution of hydrogen peroxide and sodium sulfate is then added to the solution, and (3) a method in which sodium sulfate is suspended in an aqueous solution of sodium chloride and concentrated hydrogen peroxide is added to the resulting suspension.

In this invention, any of anhydrous sodium sulfate, sodium sulfate heptahydrate and sodium sulfate decahydrate can be used as the starting material sodium sulfate, but from the industrial viewpoint the use of anhydrous sodium sulfate is preferred.

The formation of the sodium sulfate-hydrogen peroxide adduct is influenced by the concentrations of hydrogen peroxide and sodium chloride in the reaction system and the temperature of the reaction system. It is preferred that the hydrogen peroxide concentration in the reaction solution be from 70 to 800 g/l and the sodium chloride concentration in the reaction solution be from 20 to 300 g/l. In case the hydrogen peroxide concentration is too low, it is difficult to obtain the desired hydrogen peroxide adduct. In case the sodium chloride concentration is too low, it is difficult to obtain a stable adduct. In view of the reaction operations and other factors, it is preferred that sodium sulfate be reacted in a reaction solution containing 200 to 400 g/l of hydrogen peroxide and 100 to 300 g/l of sodium chloride.

As described hereinabove, the formation of a stable hydrogen peroxide adduct of sodium sulfate is influenced by the concentrations of hydrogen peroxide and sodium chloride and the reaction temperature. When a solution having a high hydrogen peroxide concentration is used, it is permissible to reduce the sodium chloride concentration, but when a solution having a low hydrogen peroxide concentration is used, it is necessary to increase the sodium chloride concentration. The reaction temperature has a great influence on the applicable ranges of the hydrogen peroxide and sodium chloride concentrations, but from the experimental results it was found that it is preferred that the reaction be carried out at a temperature of 0° to 50° C. The relation of the hydrogen peroxide and sodium chloride concentrations and the reaction temperature leading to the formation of a stable hydrogen peroxide adduct of sodium sulfate is shown in Table 1.

Table 1

| NaCl Concentration ( g/l ) | $H_2O_2$ Concentration ( g/l ) | Temperature (° C) | Stability | Product |
|---|---|---|---|---|
| 25 | 250 | 10 | — | C |
| 25 | 250 | 40 | — | D |
| 25 | 300 | 10 | unstable | B |
| 25 | 300 | 40 | — | D |
| 25 | 740 | 10 | unstable | B |

Table 1-continued

| NaCl Concentration ( g/l ) | H₂O₂ Concentration ( g/l ) | Temperature (° C) | Stability | Product |
|---|---|---|---|---|
| 25 | 740 | 40 | stable | A |
| 50 | 250 | 10 | — | C |
| 50 | 250 | 40 | — | D |
| 50 | 300 | 10 | unstable | B |
| 50 | 300 | 40 | stable | A |
| 50 | 740 | 10 | stable | A |
| 50 | 740 | 40 | stable | A |
| 100 | 250 | 10 | stable | A |
| 100 | 250 | 40 | stable | A |
| 100 | 300 | 10 | stable | A |
| 100 | 300 | 40 | stable | A |
| 100 | 740 | 10 | stable | A |
| 100 | 740 | 40 | stable | A |
| 150 | 250 | 10 | stable | A |
| 150 | 250 | 40 | stable | A |
| 150 | 300 | 10 | stable | A |
| 150 | 300 | 40 | stable | A |
| 150 | 740 | 10 | stable | A |
| 150 | 740 | 40 | stable | A |
| 230 | 150 | 10 | stable | A |
| 230 | 150 | 40 | stable | A |
| 230 | 360 | 10 | stable | A |
| 230 | 360 | 40 | stable | A |
| 230 | 670 | 10 | stable | A |
| 230 | 670 | 40 | stable | A |
| 300 | 100 | 10 | stable | A |
| 300 | 100 | 40 | stable | A |

A: anhydrous hydrogen peroxide adduct (desired product)
B: hydrogen peroxide adduct hydrate
C: sodium sulfate hydrate
D: anhydrous sodium sulfate (A and B were distinguished in the following manner; namely, the product was filtered, and if the water content of the product was lower than 5 wt.%, the product was designated as A and if the water content was 5 % or higher, the product was designated as B.)

After the reaction has been conducted according to this invention, the crystals are separated by filtration. The filtrate can be used again by adding thereto highly concentrated hydrogen peroxide, optionally with sodium chloride, so that their concentrations are returned to levels that existed before the start of the reaction.

The product thus obtained by the process of this invention was found to contain 8 to 10 per cent of hydrogen peroxide, and to contain impurities such as other adducts of sodium sulfate and hydrogen peroxide and that of sodium sulfate and sodium chloride. The analysis of the purified adduct of this invention is identified to $4Na_2SO_4.2H_2O_2.NaCl$. The thermal decomposition temperature of this adduct was found to be 180° C, which is far higher than the decomposition temperature of a known adduct of sodium sulfate and hydrogen peroxide, i.e. 63° C. It is much more stable than adducts formed by conventional methods and it has a sufficient stability that it can be put into practical use.

For comparison, (1) the adduct obtained according to the process of this invention, and (2) sodium sulfate-hydrogen peroxide adducts formed by adding sodium sulfate to a concentrated or ordinary aqueous solution of hydrogen peroxide without employing sodium chloride, were allowed to stand still at 50° C, and their stabilities were examined. The results shown in Table 2 were obtained. From these results it will readily be understood that conspicuous stabilizing effects can be attained by the process of this invention.

Table 2

Residual Amount of Available Oxygen (% based on the available oxygen in the "as-prepared" substance)

| Sample No. | Passage of Time (hours) | | | | | | |
|---|---|---|---|---|---|---|---|
| | 2 | 4 | 6 | 24 | 72 | 120 | 168 |
| 1 | 90.1 | 77.3 | 56.6 | 0.3 | | | |
| 2 | 89.3 | 79.1 | 73.5 | 23.3 | | | |
| 3 | 91.2 | 85.2 | 81.6 | 63.5 | | | |
| 4 | | | | 99.6 | 99.2 | 99.2 | 99.0 |

Sample 1: formed by adding sodium sulfate to an aqueous solution containing 35% by weight of $H_2O_2$ at 10° C.

Sample 2: formed by adding sodium sulfate to an aqueous solution containing 35% by weight of $H_2O_2$ and subjecting the mixture to concentration under reduced pressure.

Sample 3: formed by adding sodium sulfate to an aqueous solution containing 60% by weight of $H_2O_2$ and subjecting the mixture to concentration under reduced pressure.

Sample 4: formed by conducting the reaction in the presence of sodium chloride according to this invention.

In the process of this invention, it is unnecessary to use a highly concentrated hydrogen peroxide, unless especially desired. According to this invention, a stable sodium sulfate-hydrogen peroxide adduct can easily be obtained in a high yield. Accordingly, from the industrial viewpoint, the process of this invention is very advantageous.

The adduct product obtained according to this invention is neutral and inexpensive and it is characterized by a very high stability. Accordingly, it can be widely used as practical bleaching agents, sterilizers and oxidants. For example, it will be effectively used as bleaching agents for detergents, bleaching sterilizers for noodles and the like, hair dyes, oxygen gas-generating agents, and the like. Thus, the product of this invention has a very high utility.

Useful detergent compositions containing the $4Na_2SO_4 \cdot 2H_2O_2 \cdot NaCl$ adduct of this invention are described in Japanese Ser. No. 79967/74, filed July 12, 1974 (corresponding to U.S. Ser. No. 593203, filed July 7, 1975, filed in the names of Nakagawa, Sugiura, Matsunaga and Ito and entitled "Detergent Composition Containing Novel Bleaching Agent", the entire contents of which are incorporated herein by reference.

This invention will now be further described in detail by reference to the following illustrative Examples.

EXAMPLE 1

200 ml of an aqueous solution containing 25% by weight of $H_2O_2$, which was saturated with anhydrous $Na_2SO_4$, was agitated while maintaining the solution at 10° C, and in this state 50 g of NaCl was added to the solution. A white stable hydrogen peroxide adduct containing 9 to 10 weight % of $H_2O_2$ was obtained.

EXAMPLE 2

200 ml of an aqueous solution containing 100 g/l of $H_2O_2$ and 300 g/l of NaCl was agitated at 10° C and 60 g of anhydrous $Na_2SO_4$ was added to the solution. Then, the misture was agitated for 30 minutes and filtered, and the recovered solids were dried to obtain 64 g of a stable hydrogen peroxide adduct containing 8.2 to 8.5 wt. % of $H_2O_2$.

EXAMPLE 3

200 ml of an aqueous solution containing 350 g/l of $H_2O_2$ and 230 g/l of NaCl was agitated at 25° C, and 60 g of anhydrous $Na_2SO_4$ was added thereto. The mixture was agitated for 30 minutes and filtered, and the recovered solids were dried to obtain 60 g of a stable hydrogen peroxide adduct containing 9.0 to 9.5 wt. % of $H_2O_2$.

EXAMPLE 4

An aqueous solution containing 60% by weight of $H_2O_2$ and NaCl were added to the filtrate obtained in Example 3, so that the concentrations of hydrogen peroxide and sodium chloride were at the same levels as in the starting solution used in Example 3. Then, 54 g of anhydrous $Na_2SO_4$ was added to 200 ml of the thus formed solution, and the mixture was treated in the same manner as in Example 3 to obtain a stable hydrogen peroxide adduct containing 9.0 to 9.5 wt. % of $H_2O_2$.

EXAMPLE 5

200 ml of an aqueous solution containing 300 g/l of $H_2O_2$ and 50 g/l of NaCl was maintained at 40° C and 100 g of anhydrous $Na_2SO_4$ was added to the solution. The mixture was treated in the same manner as in Example 3 to obtain a stable hydrogen peroxide adduct containing 10.0 to 10.5 wt. % of $H_2O_2$.

EXAMPLE 6

Sodium sulfate and sodium chloride were used in the amounts described in the following Table 3. They were mixed with 100 ml of 30 per cent hydrogen peroxide aqueous solution and dissolved therein on a water bath maintained at 40° C. The solution was concentrated at 40° C under reduced pressure. At this time the crystals were precipitated, followed which the crystals were separated and dried. The thus obtained crystals were analyzed with X-ray diffraction and chemical analysis. The results are shown in Table 3.

Table 3

| Test No. | | 6–1 | 6–2 |
|---|---|---|---|
| Amount of sodium sulfate | | 14.20 g | 10.65 g |
| Amount of sodium chloride | | 5.42 g | 16.35 g |
| Molar ratio of sodium sulfate to sodium chloride | | 1:1 | 1:4 |
| X-ray diffraction | sodium chloride | — | — |
| | sodium sulfate | — | — |
| | $Na_2SO_4 \cdot nH_2O$ | — | — |
| | novel diffraction pattern | + | + |
| Chemical analysis | hydrogen peroxide | 9.71 % | 9.54 % |
| | sodium chloride | 8.56 % | 9.10 % |
| | sodium sulfate | 81.73 % | 81.36 % |
| Composition calculated from the above data | | Mol Ratio | |
| | hydrogen peroxide | 1.985 | 1.958 |
| | sodium chloride | 1.018 | 1.087 |
| | sodium sulfate | 4.000 | 4.000 |
| Decomposition temperature | | 180° C | 180° C |

In the foregoing Examples, the products contained minor amounts of various impurities, such as unreacted starting materials, so that the $H_2O_2$ content thereof differed from the theoretical value of 9.79 wt.%, for the adduct $4Na_2SO_4 \cdot 2H_2O_2 \cdot NaCl$. Further purification of these products, if desired, produces the adduct in purer form.

The embodiments of the invention in which an exclusive property or privilege is claimed are defined as follows:

1. An adduct having the formula: $4Na_2SO_4 \cdot 2H_2O_2 \cdot NaCl$.

2. An adduct as claimed in claim 1, having a thermal decomposition temperature of 180° C.

3. An adduct which has been prepared by reacting sodium sulfate with hydrogen peroxide, in an aqueous solution, at a reaction temperature of from 0° to 50° C, in the presence of sodium chloride, wherein the concentration of hydrogen peroxide in the reaction system is from 70 to 800 g/l and the concentration of sodium chloride in the reaction system is from 20 to 300 g/l, and recovering the solids from the reaction system.

4. A process which comprises reacting sodium sulfate with hydrogen peroxide, at a reaction temperature of from 0° to 50° C, in an aqueous solution, in the presence of sodium chloride, wherein the concentration of hydrogen peroxide in the reaction system is from 70 to 800 g/l and the concentration of sodium chloride in the reaction system is from 20 to 300 g/l, and recovering from the reaction system an adduct having the formula $4Na_2SO_4 \cdot 2H_2O_2 \cdot NaCl$.

5. A process as claimed in claim 4 in which the concentration of hydrogen peroxide in the reaction system is from 200 to 400 g/l and the concentration of sodium chloride in the reaction system is 100 to 300 g/l.

* * * * *